US011947286B2

(12) United States Patent
Hayakawa

(10) Patent No.: US 11,947,286 B2
(45) Date of Patent: Apr. 2, 2024

(54) BELT CONVEYANCE DEVICE AND IMAGE FORMING APPARATUS

(71) Applicant: KYOCERA Document Solutions Inc., Osaka (JP)

(72) Inventor: Taisei Hayakawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/185,903

(22) Filed: Mar. 17, 2023

(65) Prior Publication Data

US 2023/0305448 A1 Sep. 28, 2023

(30) Foreign Application Priority Data

Mar. 25, 2022 (JP) ................................ 2022-049902

(51) Int. Cl.
*G03G 15/20* (2006.01)
*G03G 15/16* (2006.01)

(52) U.S. Cl.
CPC ................................ *G03G 15/1615* (2013.01)

(58) Field of Classification Search
CPC .................................................. G03G 15/1615
USPC ........................................ 399/162, 165, 308
See application file for complete search history.

(56) References Cited

U.S. PATENT DOCUMENTS 9,274,459 B1 * 3/2016 Tokoro ............... G03G 15/1615
2014/0083821 A1 3/2014 Hozumi et al. ............... 198/806
2016/0251166 A1 9/2016 Hozumi et al. ........ B65G 39/16

FOREIGN PATENT DOCUMENTS

CN 105404119 * 9/2018
JP 2014-211612 A 11/2014

* cited by examiner

*Primary Examiner* — Hoan H Tran
(74) *Attorney, Agent, or Firm* — Stein IP, LLC

(57) ABSTRACT

A correction mechanism incorporated in a belt conveyance device includes a pair of inclined bearings and a pair of main body guides, and corrects meandering of an endless belt. The pair of inclined bearings include a pair of inclined portions, and support a shaft portion of a roller that stretches the belt. The pair of main body guides contact the pair of inclined portions, and, when the belt meanders, cause one end part side of the roller in the axial direction thereof to move in a direction perpendicular to the axial direction thereof. The pair of inclined portions and the pair of main body guides are disposed inward of opposite end parts of the roller in the axial direction thereof, as seen from a direction perpendicular to the axial direction of the roller.

7 Claims, 5 Drawing Sheets

BELT CONVEYANCE DEVICE AND IMAGE FORMING APPARATUS

INCORPORATION BY REFERENCE

This application is based on and claims the benefit of priority from Japanese Patent Application No. 2022-049902 filed on Mar. 25, 2022, the contents of which are hereby incorporated by reference.

BACKGROUND

The present disclosure relates to a belt conveyance device and an image forming apparatus.

As a component of image forming apparatuses such as copiers, printers, etc., there has been known a belt conveyance device provided with an endless belt, examples of which include an intermediate transfer belt and a conveyance belt. For example, the intermediate transfer belt has toner images of different colors formed by a plurality of photosensitive drums, for example, primarily transferred thereon to be sequentially superposed one on another, and secondarily transfers the toner images onto a sheet. The conveyance belt attracts and conveys a sheet, for example. With such a belt conveyance device, the belt may deviate in an axial direction of a roller rotatably stretching the belt, that is, the belt can meander. To cope with this problem, there has been proposed a technology for stopping such meandering of the belt by adjusting roller alignment.

SUMMARY

According to one aspect of the present disclosure, a belt conveyance device includes a belt that is endless, a plurality of rollers, and a correction mechanism. The plurality of rollers rotatably stretch the belt therearound. The correction mechanism corrects meandering of the belt with respect to the rollers. The correction mechanism includes a pair of inclined bearings and a pair of main body guides. The pair of inclined bearings include a pair of inclined portions that are inclined to be symmetric with respect to an axial direction of the rollers, rotatably support a shaft portion of one roller among the plurality of rollers, and are movable in an axial direction of the one roller. The pair of main body guides contact the pair of inclined portions, and when the belt meanders, cause one end part side of the one roller in the axial direction thereof to move in a direction perpendicular to the axial direction thereof, along with the pair of inclined bearings that move in the axial direction of the one roller as a result of the meandering of the belt. The pair of inclined portions and the pair of main body guides are disposed inward of opposite end parts of the one roller in the axial direction thereof, as seen from a direction perpendicular to the axial direction of the one roller.

DETAILED DESCRIPTION

Hereinafter, embodiments of the present disclosure will be described with reference to the drawings. The present disclosure, however, is not limited to what is specifically described below.

Figure 1:
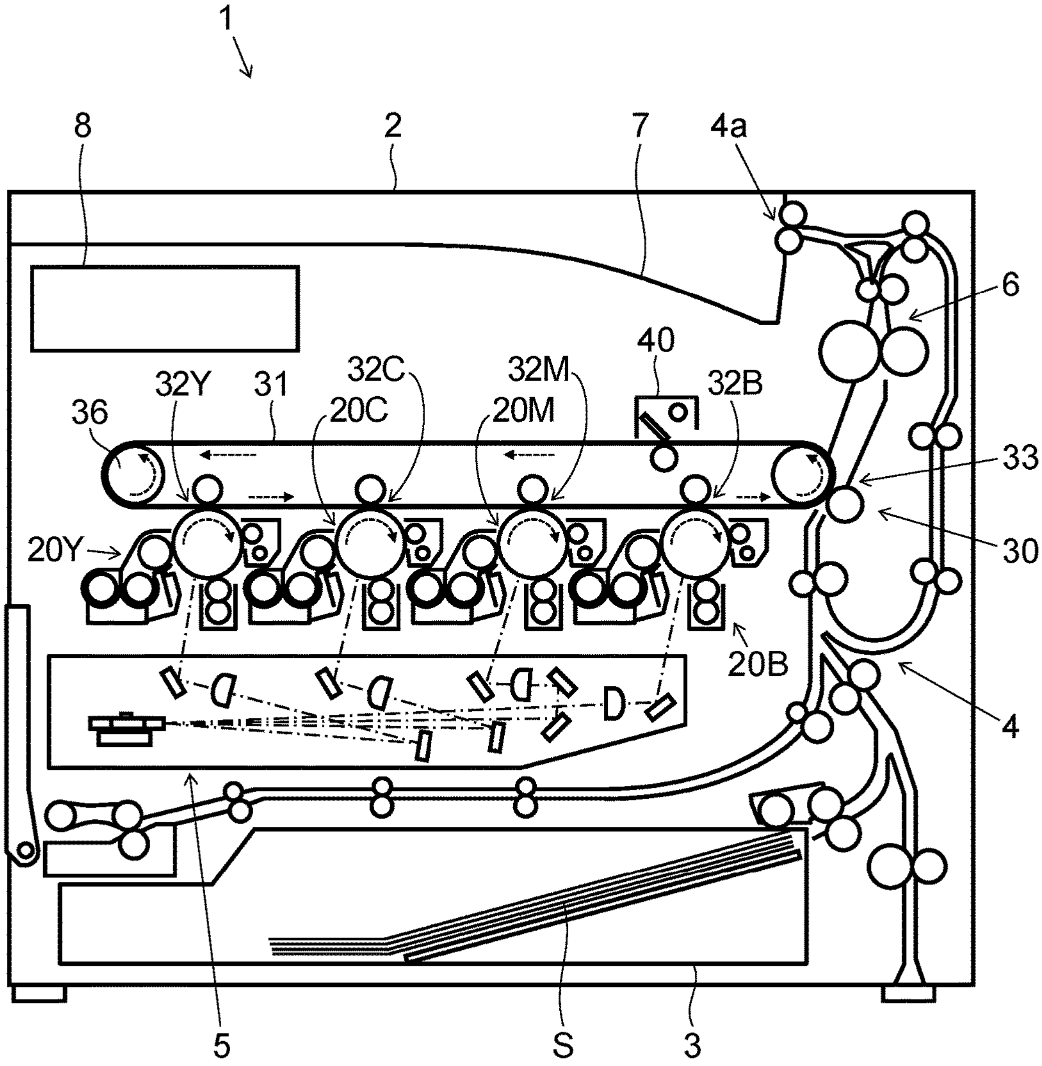
FIG. 1 is a schematic sectional front view of an image forming apparatus according to an embodiment of the present disclosure.
Figure 2:
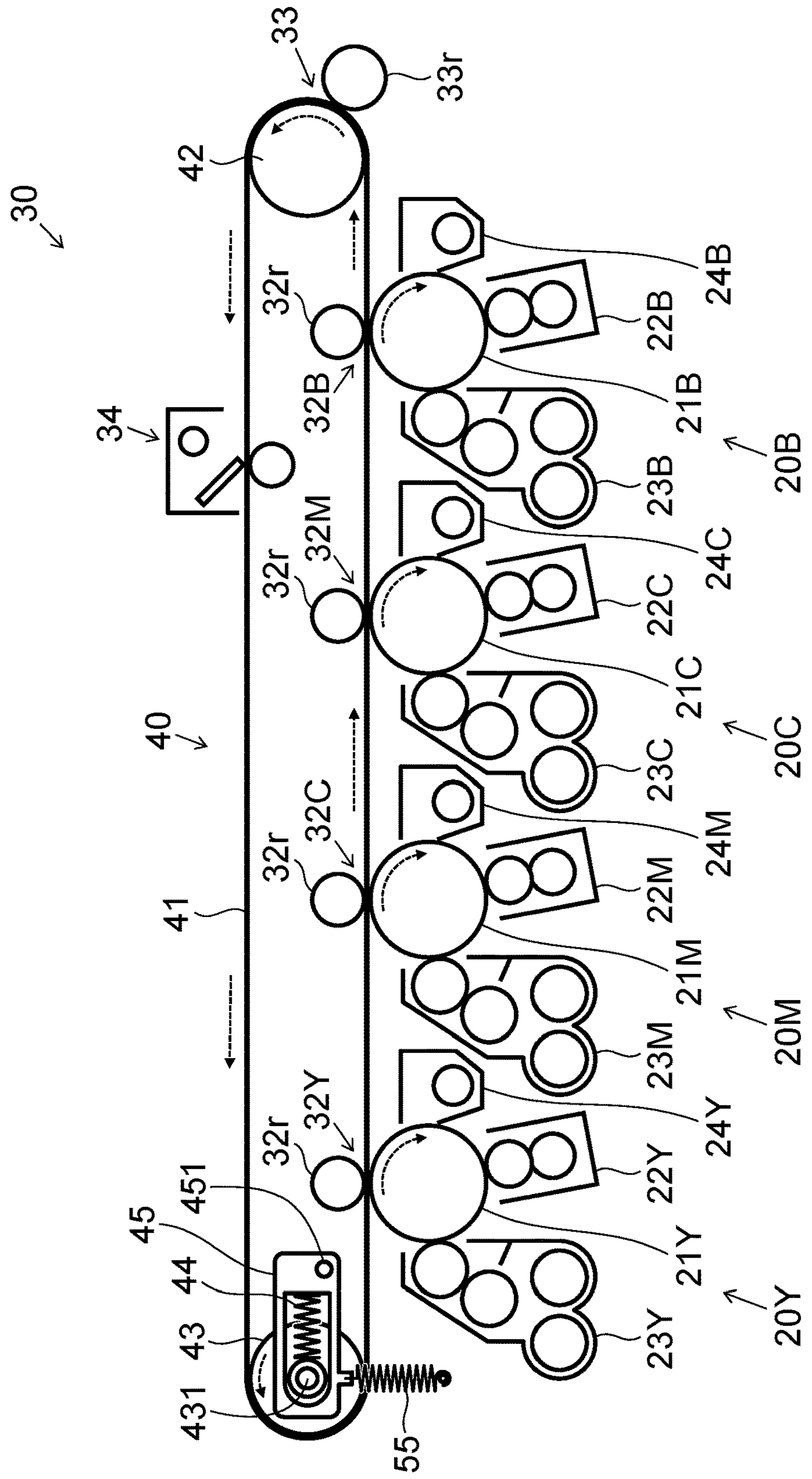
FIG. 2 is a schematic sectional front view of a belt conveyance device incorporated in the image forming apparatus shown in FIG. 1.

FIG. 1 is a schematic sectional front view of an image forming apparatus 1 according to an embodiment. FIG. 2 is a schematic sectional front view of a belt conveyance device incorporated in the image forming apparatus 1 shown in FIG. 1. An example of the image forming apparatus 1 of the present embodiment is a tandem-type color printer that uses an intermediate transfer belt 41 to transfer toner images onto a sheet S. The image forming apparatus 1 may be what is called a multifunction peripheral which is provided with functions of printing, scanning (image reading), facsimile transmitting and receiving, etc., for example.

As shown in FIG. 1, the image forming apparatus 1 includes, in its main body 2, a sheet feeding portion 3, a sheet conveying portion 4, an exposure portion 5, an image forming portion 20, a transfer portion 30, a fixing portion 6, a sheet discharge portion 7, and a control portion 8.

The sheet feeding portion 3 is disposed at a bottom part of the main body 2. The sheet feeding portion 3 stores therein a plurality of sheets (recording media) S before printing, and, during printing, feeds them out separately one by one. The sheet conveying portion 4 extends in an up-down direction along a side wall of the main body 2. The sheet conveying portion 4 conveys a sheet S fed out from the sheet feeding portion 3 to a secondary transfer portion 33 and then to the fixing portion 6, and further discharges the sheet S after the fixing through a sheet discharge port **4*a* to the sheet discharge portion 7. The exposure portion 5 is disposed above the sheet feeding portion 3. The exposure portion 5 irradiates the image forming portion 20** with laser light that is controlled based on image data.

The image forming portion 20 is disposed above the exposure portion 5 but below the intermediate transfer belt 41. The image forming portion 20 includes an image forming portion 20Y for yellow, an image forming portion 20C for cyan, an image forming portion 20M for magenta, and an image forming portion 20B for black. These four image forming portions 20 are similar to each other in basic structure. Thus, hereinafter, the color signs 'Y', 'C', 'M', and 'B' provided for distinction among the different colors may sometimes be omitted unless specific distinction is necessary.

The image forming portions 20 each include a photosensitive drum (an image carrier) 21 that is supported to be rotatable in a predetermined direction (clockwise in FIGS. 1 and 2). The image forming portions 20 each further include a charging portion 22, a developing portion 23, and a drum cleaning portion 24 arranged around the photosensitive drum 21 along a rotation direction thereof. Note that between the developing portion 23 and the drum cleaning portion 24, a primary transfer portion 32 is disposed.

The photosensitive drum 21 has a photosensitive layer on an outer circumferential surface thereof. The charging portion 22 charges the outer circumferential surface of the photosensitive drum 21 to a predetermined potential. The exposure portion 5 exposes, to light, the outer circumferential surface of the photosensitive drum 21 having been charged by the charging portion 22, and thereby forms an electrostatic latent image of a document image on the outer circumferential surface of the photosensitive drum 21. The developing portion 23 supplies toner to this electrostatic latent image, and thereby develops the electrostatic latent image into a toner image. The four image forming portions 20 respectively form toner images of different colors. The drum cleaning portion 24, after the toner image is primarily transferred onto an outer circumferential surface of the intermediate transfer belt 41, performs cleaning by removing toner and the like remaining on the outer circumferential surface of the photosensitive drum 21. In this manner, the image forming portions 20 each form an image (a toner image) to be later transferred onto a sheet S.

The transfer portion 30 includes a belt conveyance device 40, primary transfer portions 32Y, 32C, 32M, and 32B, a secondary transfer portion 33, and a belt cleaning portion 34. The belt conveyance device 40 is disposed above the four image forming portions 20. The belt conveyance device 40 includes the intermediate transfer belt 41 supported to be rotatable in a predetermined direction (counterclockwise in FIGS. 1 and 2). The intermediate transfer belt 41 is an endless intermediate transfer body onto which toner images formed one on the outer circumferential surface of the photosensitive drum 21 in each of the four image forming portions 20 are sequentially primarily transferred to be superposed one on another. The four image forming portions 20 are disposed in what is called a tandem arrangement to align from an upstream side toward a downstream side in a rotation direction of the intermediate transfer belt 41.

The primary transfer portions 32Y, 32C, 32M, and 32B are respectively arranged over the image forming portions 20Y, 20C, 20M, and 20B for the different colors, with the intermediate transfer belt 41 therebetween. The secondary transfer portion 33 is disposed at a position that is upstream of the fixing portion 6 with respect to a sheet conveying direction of the sheet conveying portion 4 and downstream of the four image forming portions 20Y, 20C, 20M, and 20B with respect to the rotation direction of the intermediate transfer belt 41. The belt cleaning portion 34 is disposed downstream of the secondary transfer portion 33 with respect to the rotation direction of the intermediate transfer belt 41.

The primary transfer portions 32 each transfer a toner image formed on the outer circumferential surface of the corresponding photosensitive drum 21 onto the intermediate transfer belt 41. In other words, at the primary transfer portions 32Y, 32C, 32M, and 32B for the different colors, the toner images are primarily transferred onto the outer circumferential surface of the intermediate transfer belt 41. Then, along with rotation of the intermediate transfer belt 41, with predetermined timing, the toner images formed at the four image forming portions 20 are sequentially transferred onto the intermediate transfer belt 41 to be superposed one on another, and thereby, on the outer circumferential surface of the intermediate transfer belt 41, a color toner image is formed in which toner images of the four colors, namely, yellow, cyan, magenta, and black, are superposed one on another.

The color toner image on the outer circumferential surface of the intermediate transfer belt 41 is transferred onto a sheet S that has been synchronously conveyed by the sheet conveying portion 4, at a secondary transfer nip portion formed in the secondary transfer portion 33. The belt cleaning portion 34 performs cleaning by removing deposits such as residual toner and the like remaining on the outer circumferential surface of the intermediate transfer belt 41 after the secondary transfer. In this manner, the transfer portion 30 transfers (records) the toner image formed on the outer circumferential surface of each photosensitive drum 21 onto the sheet S.

The fixing portion 6 is disposed above the secondary transfer portion 33. The fixing portion 6 applies heat and pressure to the sheet S to which the toner images have been transferred, and thereby fixes the toner images on the sheet S.

The sheet discharge portion 7 is disposed above the transfer portion 30. The printed sheet S having the toner images fixed thereon is conveyed to the sheet discharge portion 7. The sheet discharge portion 7 is structured such that a printed sheet (printed matter) can be taken out of it from above.

The control portion 8 includes a CPU, an image processor, a storage, and other electronic circuits and parts (of which none is illustrated). The CPU controls operations of various components provided in the image forming apparatus 1 on the basis of a control program and control data stored in the storage, and thereby performs processing related to functions of the image forming apparatus 1. The sheet feeding portion 3, the sheet conveying portion 4, the exposure portion 5, the image forming portion 20, the transfer portion 30, and the fixing portion 6 each individually receive a command from the control portion 8, and cooperate with each other to perform printing with respect to a sheet S. The storage is composed of, for example, a combination of nonvolatile storage devices such as a program ROM (read only memory), a data ROM, etc., and a volatile storage device such as a RAM (random access memory).

Next, a structure of the belt conveyance device 40 will be described with reference to FIG. 2.

The belt conveyance device 40 is, as shown in FIG. 2, disposed along and above the four image forming portions 20Y, 20C, 20M, and 20B. The belt conveyance device 40 includes the intermediate transfer belt 41, a driving roller 42, a tension roller 43, a pair of tension springs 44, and a pair of tension guide members 45.

The intermediate transfer belt 41 is an endless belt rotatably stretched around a plurality of rollers. In the present embodiment, included in the plurality of rollers are the driving roller 42 and the tension roller 43. Above the four image forming portions 20Y, 20C, 20M, and 20B via the intermediate transfer belt 41, four primary transfer rollers 32*r* are disposed one for each of the four image forming portions 20Y, 20C, 20M, and 20B. Each of the four primary transfer rollers 32*r* is disposed at a position opposite the photosensitive drum 21 with the intermediate transfer belt 41 therebetween, and contacts an inner circumferential surface of the intermediate transfer belt 41.

The driving roller 42 is disposed downstream of the four image forming portions 20Y, 20C, 20M, and 20B with respect to the rotation direction of the intermediate transfer belt 41. The driving roller 42 receives power from a driving motor (unillustrated), and causes the intermediate transfer belt 41 to rotate counterclockwise in FIG. 2.

The driving roller 42 is disposed adjacent to the secondary transfer portion 33. In the secondary transfer portion 33, a secondary transfer roller 33*r* is disposed. The secondary transfer roller 33*r* is disposed at a position opposite the driving roller 42 with the intermediate transfer belt 41 therebetween, and contacts the outer circumferential surface of the intermediate transfer belt 41.

The tension roller 43 is disposed upstream of the four image forming portions 20Y, 20C, 20M, and 20B with respect to the rotation direction of the intermediate transfer belt 41. The tension roller 43 follows the rotation of the intermediate transfer belt 41 to rotate counterclockwise in FIG. 2. The tension roller 43 is biased by the pair of tension springs 44 in a direction of separation from the driving roller 42. Thereby, predetermined tension is applied to the intermediate transfer belt 41.

The pair of tension springs 44 are held inside the pair of tension guide members 45. The pair of tension springs 44 are each constituted of a compression coil spring, for example, and are disposed between the pair of tension guide members 45 and a shaft portion 431 of the tension roller 43. The pair of tension springs 44 bias the tension roller 43 in the direction of separation from the driving roller 42.

The pair of tension guide members 45 are each disposed at one of opposite end parts of the tension roller 43 in an axial direction thereof (a depth direction of the plane of FIG. 2). The pair of tension guide members 45 each include a shaft portion 451 that is disposed closer to the driving roller 42 than the tension roller 43 is, and that extends parallel to the axial direction of the tension roller 43. The pair of tension guide members 45 are supported in the main body 2 so as to be rotatable about an axis of the shaft portion 451.

The pair of tension guide members 45 are each formed of sheet metal, for example, and extend in a direction perpendicular to the axial direction of the tension roller 43 as well as in an up-down direction. The pair of tension guide members 45 support the shaft portion 431 of the tension roller 43 so as to be movable in directions of approach and separation with respect to the driving roller 42. The pair of tension guide members 45 are, by a later-described pair of biasing members 55 disposed below the pair of tension guide members 45, each biased in a direction in which a tension-roller-43 side thereof rotate downward about the axis of the shaft portion 451.

First Embodiment

Figure 3:
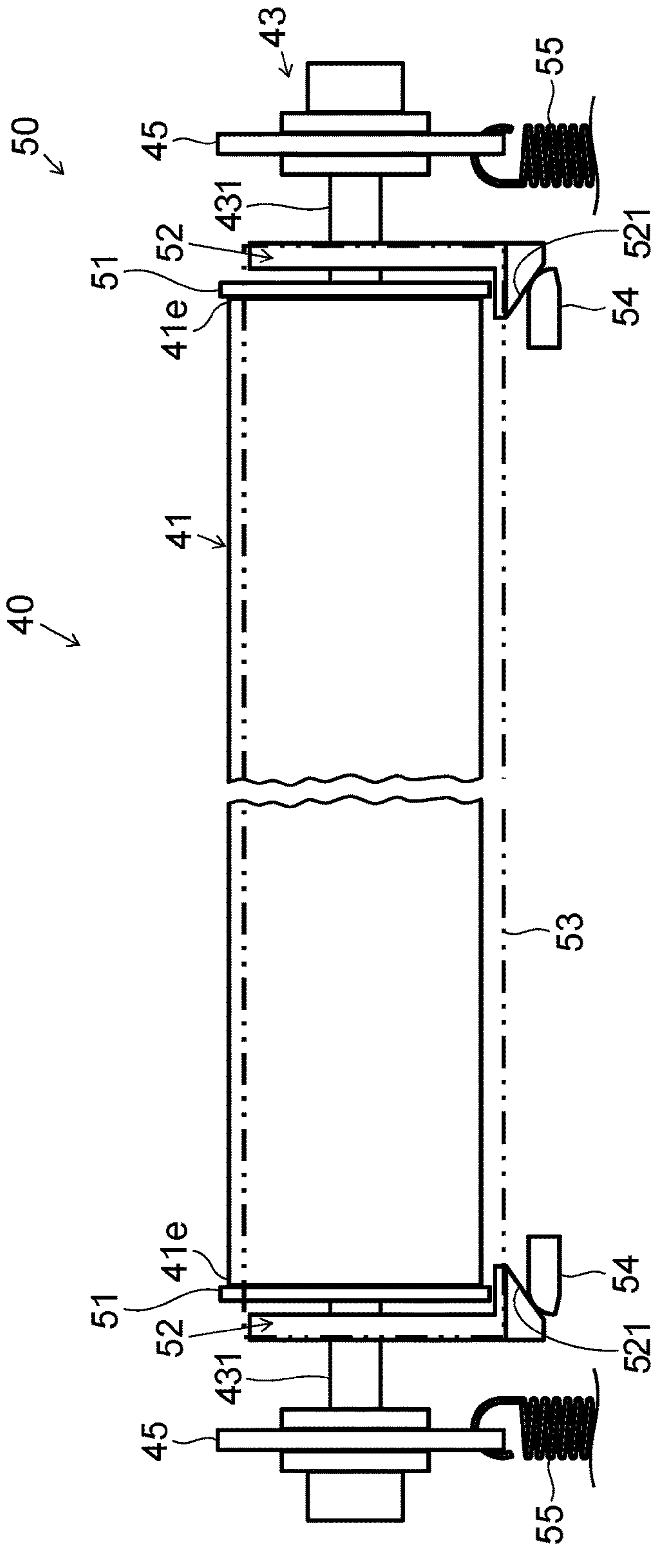
FIG. 3 is a side view of a belt conveyance device according to a first embodiment of the present disclosure.
Figure 4:
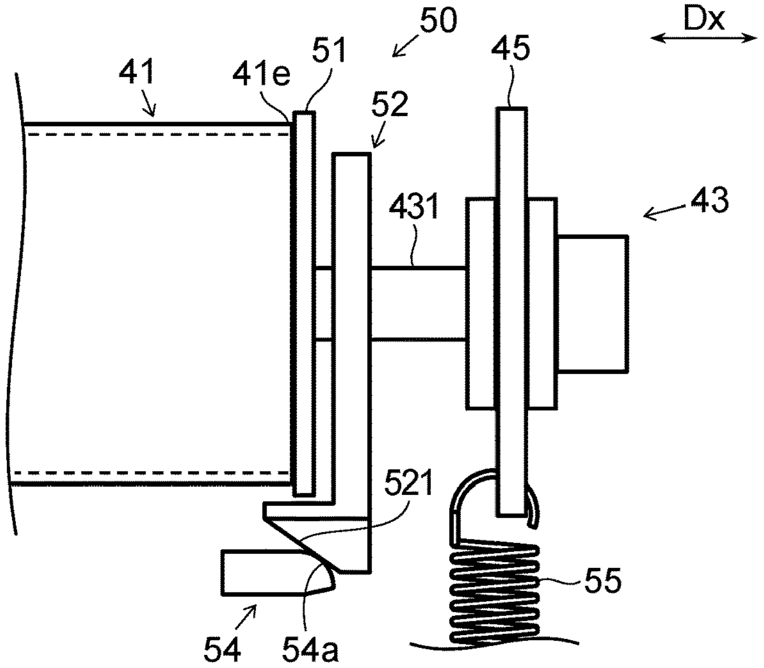
FIG. 4 is a partial side view of and around a tension roller of the belt conveyance device shown in FIG. 3.
Figure 5:
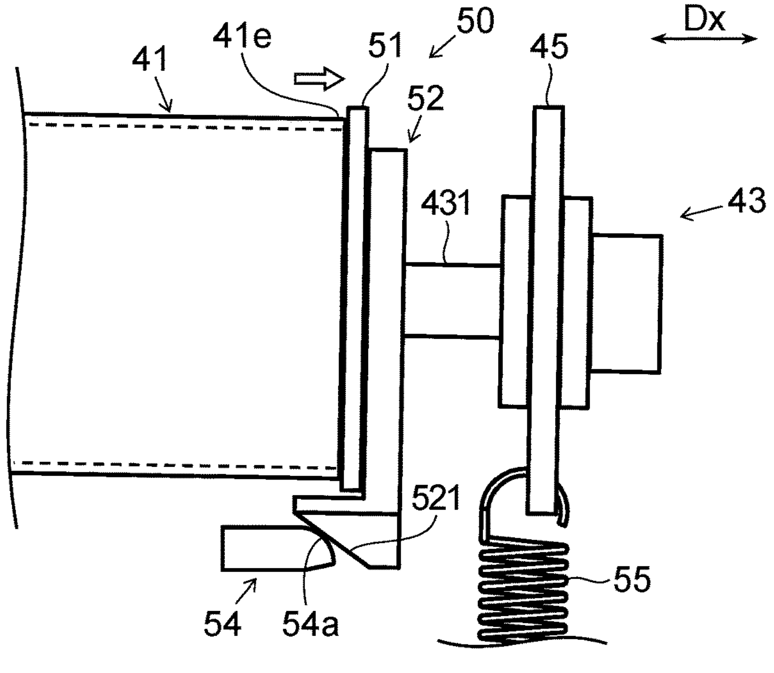
FIG. 5 is a partial side view of and around the tension roller shown in FIG. 4, showing a state where an intermediate transfer belt has meandered.

Next, a description will be given of a structure of and around a tension roller 43 of a belt conveyance device 40 according to a first embodiment, with reference to FIGS. 3, 4, and 5. FIG. 3 is a side view of the belt conveyance device 40 according to the first embodiment. FIG. 4 is a partial side view of and around the tension roller 43 of the belt conveyance device 40 shown in FIG. 3. FIG. 5 is a partial side view of and around the tension roller 43 shown in FIG. 4, showing a state where the intermediate transfer belt 41 has meandered.

Note that FIGS. 4 and 5 are views of and around one end part of the tension roller 43 in an axial direction Dx of the tension roller 43 as seen from a direction perpendicular to the axial direction Dx of the tension roller 43. In each of FIGS. 4 and 5, a left side in the diagram corresponds to an inner side of the tension roller 43 in its axial direction Dx, while a right side corresponds to an outer side of the tension roller 43 in its axial direction Dx. For the convenience of description, in FIG. 3, a coupling member 53, which will be described later, is indicated with a dashed-and-double-dotted line for easy view of the other components. In FIGS. 4 and 5, illustration of the coupling member 53 is omitted. These apply also to FIGS. 6 and 7, which will be referred to later.

The belt conveyance device 40 further includes a correction mechanism 50, which is shown in FIGS. 3, 4, and 5. The correction mechanism 50 is disposed at the opposite end parts of the tension roller 43 in its axial direction Dx and below the tension roller 43. The correction mechanism 50 corrects meandering of the intermediate transfer belt 41 with respect to the tension roller 43. The correction mechanism 50 includes a pair of belt guides 51, a pair of inclined bearings 52, the coupling member 53, a pair of main body guides 54, and the pair of biasing members 55.

The pair of belt guides 51 are disposed one at each of the opposite end parts of the tension roller 43 in its axial direction Dx. The pair of belt guides 51 are located at positions that are inward of the pair of inclined bearings 52 but are outward of the intermediate transfer belt 41 with respect to the axial direction Dx of the tension roller 43. The pair of belt guides 51 are movable in the axial direction Dx of the tension roller 43.

The pair of belt guides 51 are each an annular ring-shaped member that extends in a radial direction thereof with the axis of the tension roller 43 as a center, and that projects outward in the radial direction beyond the outer circumferential surface of the intermediate transfer belt 41. The shaft portion 431 of the tension roller 43 penetrates, in its axial direction Dx, center parts of the pair of belt guides 51 in the radial direction. The pair of belt guides 51 are opposite, and contact, side edges 41*e* of the intermediate transfer belt 41 in the axial direction Dx of the tension roller 43.

The pair of inclined bearings 52 are disposed outward of the pair of belt guides 51 in the axial direction Dx of the tension roller 43. The pair of inclined bearings 52 support the shaft portion 431 of the tension roller 43 to be rotatable about an axis of the shaft portion 431. The pair of inclined bearings 52 are movable in the axial direction Dx of the tension roller 43.

The coupling member 53 is disposed at a position beside the tension roller 43 and that is outward to the tension roller 43 in a radial direction of the tension roller 43 such that the coupling member 53 is separated from the tension roller 43. The coupling member 53 is a plate-shaped member that extends along the up-down direction as well as along the axial direction Dx of the tension roller 43. The coupling member 53 connects with each of the pair of inclined bearings 52 at the opposite end parts of the tension roller 43 in its axial direction Dx. That is, the coupling member 53 couples the pair of inclined bearings 52 to each other. With this arrangement, the pair of inclined bearings 52 simultaneously move in a same direction along the axial direction Dx of the tension roller 43.

Further, the pair of inclined bearings 52 have a pair of inclined portions 521. The pair of inclined portions 521 are each disposed at a lower part of a corresponding one of the pair of inclined bearings 52. Further, the pair of inclined portions 521 are each located below the tension roller 43 as seen from the side perpendicular to the axial direction Dx of the tension roller 43. The pair of inclined portions 521 are each opposite to a corresponding one of the pair of main body guides 54.

An outer surface of each of the pair of inclined portions 521 is inclined with respect to the axial direction Dx of the tension roller 43. Specifically, the inclined portions 521 are each inclined outward from a center part side of the tension roller 43 in its radial direction (up to down in FIGS. 4 and 5) as the inclined portions 521 extend from an inner side toward an outer side of the tension roller 43 in its axial direction Dx (left to right in FIGS. 4 and 5). Note that the pair of inclined portions 521 are inclined to be symmetric with respect to a center part of the tension roller 43 in the axial direction Dx thereof.

The pair of main body guides 54 are disposed at positions opposite to the pair of inclined portions 521, and are fixed to the main body 2. The pair of main body guides 54 are constituted of a pair of bar-shaped members, and extend in a direction perpendicular to the axial direction Dx of the tension roller 43 (depth directions of the planes of FIGS. 3, 4, and 5). In other words, the pair of main body guides 54 extend along the rotation direction of the intermediate transfer belt 41.

The pair of main body guides 54 include curved portions 54*a* that extend outward from top parts thereof in the axial direction Dx to be opposite to the pair of inclined portions 521. The pair of main body guides 54 are opposite to, and contact, the pair of inclined portions 521 in the up-down direction as well as in the axial direction Dx. Specifically, the curved portions 54*a* of the main body guides 54 are opposite to, and contact, the inclined surfaces of the pair of inclined portions 521.

The pair of biasing members 55 are disposed below the pair of tension guide members 45. The pair of biasing members 55 are each constituted of an extension coil spring, for example, and are connected between the main body 2 and the pair of tension guide members 45. The pair of biasing members 55 bias the shaft portion 431 of the tension roller 43 downward via the pair of tension guide members 45. In other words, the pair of biasing members 55 bias the pair of inclined bearings 52 toward the pair of main body guides 54 so as to keep the pair of inclined bearings 52 in contact with the pair of main body guides 54.

As shown in FIG. 4, as a result of the shaft portion 431 of the tension roller 43 being biased downward by the pair of biasing members 55, the pair of inclined bearings 52 are pressed against the pair of main body guides 54. In a case where the intermediate transfer belt 41 is in normal rotation without meandering, the shaft portion 431 of the tension roller 43 is substantially horizontal. During the normal rotation of the intermediate transfer belt 41, the state shown in FIG. 4 is maintained.

As shown in FIG. 5, when the intermediate transfer belt 41 meanders, the intermediate transfer belt 41 comes into contact with one of the pair of belt guides 51 so as to press the belt guide 51 outward in the axial direction Dx (rightward in FIG. 5). The belt guide 51 moves outward in the axial direction Dx. Then, the belt guide 51 presses the inclined bearing 52 outward in the axial direction Dx (rightward in FIG. 5). The inclined bearing 52 moves outward in the axial direction Dx.

Thereby, the inclined bearing 52 slides on the main body guide 54 via the inclined surface of its inclined portion 521, as a result of which the one end part side (the right side in FIG. 5) of the tension roller 43 in its axial direction Dx moves downward. That is, the main body guide 54 causes the one end part side of the tension roller 43 in its axial direction Dx to move in a direction perpendicular to the axial direction Dx along with the pair of inclined bearings 52 which are caused to move in the axial direction Dx of the tension roller 43 by the meandering of the intermediate transfer belt 41.

Then, the entire tension roller 43 is caused to incline, and the meandering of the intermediate transfer belt 41 stops. In this manner, the intermediate transfer belt 41 continues to rotate stably.

As described above, the pair of inclined portions 521 and the pair of main body guides 54 are disposed inward of the opposite end parts of the tension roller 43 in its axial direction Dx, as seen from a direction perpendicular to the axial direction Dx. According to this structure, the pair of inclined portions 521 and the pair of main body guides 54 of the correction mechanism 50, which cause the tension roller 43 to incline, are not located outward of the opposite end parts of the tension roller 43 in its axial direction Dx. That is, the belt conveyance device 40 can be made compact in the axial direction Dx of the tension roller 43. Thus, the belt conveyance device 40 can stop meandering of the intermediate transfer belt 41 with a compact structure.

Further, to be more specific, the pair of inclined portions 521 and the pair of main body guides 54 are disposed below the tension roller 43. According to this structure, by making use of action of gravity on the tension roller 43, it is possible to easily cause the pair of inclined portions 521 and the pair of main body guides 54 to contact each other. Thus, the correction mechanism 50 can be achieved with a simple structure, and the belt conveyance device 40 can be improved in compactness.

Further, the correction mechanism 50 is disposed in the vicinity of the tension roller 43, and includes the pair of belt guides 51, the pair of inclined bearings 52, the pair of main body guides 54, and the pair of biasing members 55, of which the structures have been described above. At the tension roller 43, due to tension applied to the intermediate transfer belt 41, meandering of the intermediate transfer belt 41 is likely to occur. Thus, by providing, with respect to the tension roller 43, the correction mechanism 50 which is an alignment adjusting mechanism, it is possible to achieve an improved performance of stopping meandering of the intermediate transfer belt 41.

Second Embodiment

Figure 6:
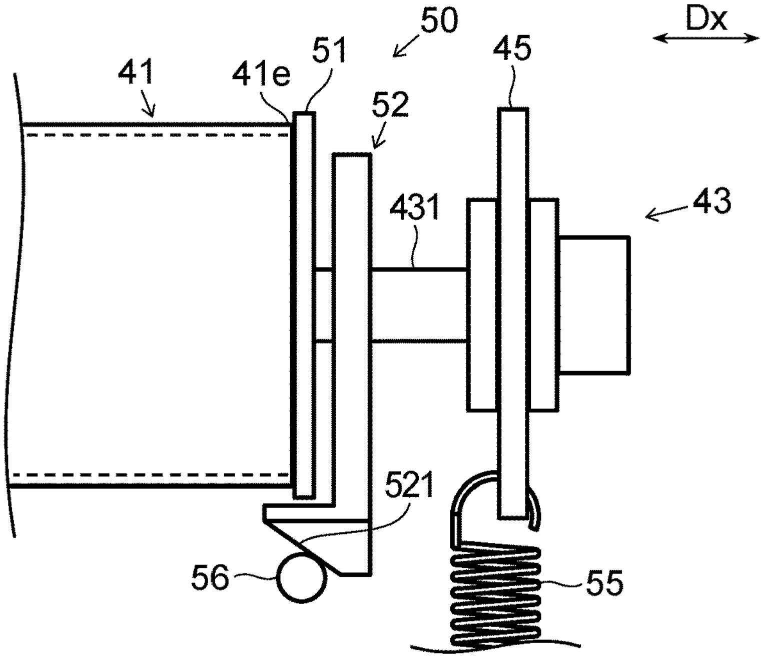
FIG. 6 is a partial side view of and around a tension roller of a belt conveyance device according to a second embodiment of the present disclosure.

Next, a description will be given of a structure of and around the tension roller 43 of the belt conveyance device 40 according to a second embodiment, with reference to FIG. 6. FIG. 6 is a partial side view of and around the tension roller 43 of the belt conveyance device 40 according to the second embodiment of the present disclosure. The structure of the second embodiment is basically the same as that of the first embodiment described previously; accordingly, such components as are found also in the first embodiment are identified by common reference signs or part names, and overlapping description thereof may be omitted.

The belt conveyance device 40 of the second embodiment includes a correction mechanism 50. The correction mechanism 50 is disposed at the opposite end parts of the tension roller 43 in its axial direction Dx and below the tension roller 43. The correction mechanism 50 includes a pair of belt guides 51, a pair of inclined bearings 52, a coupling member 53 (unillustrated in FIG. 6), a pair of main body guides 56, and a pair of biasing members 55.

The pair of main body guides 56 extend in a direction perpendicular to the axial direction Dx of the tension roller 43 (depth directions of the planes of FIGS. 3, 4, and 5). In other words, the pair of main body guides 56 extend along the rotation direction of the intermediate transfer belt 41. The pair of main body guides 56 are constituted of a pair of cylindrical members of which outer circumferential surfaces contact a pair of inclined portions 521.

According to this structure, the pair of main body guides 56 can be formed easily. Accordingly, the correction mechanism 50 can be achieved with a simple structure, and the belt conveyance device 40 can be improved in compactness.

Third Embodiment

Figure 7:
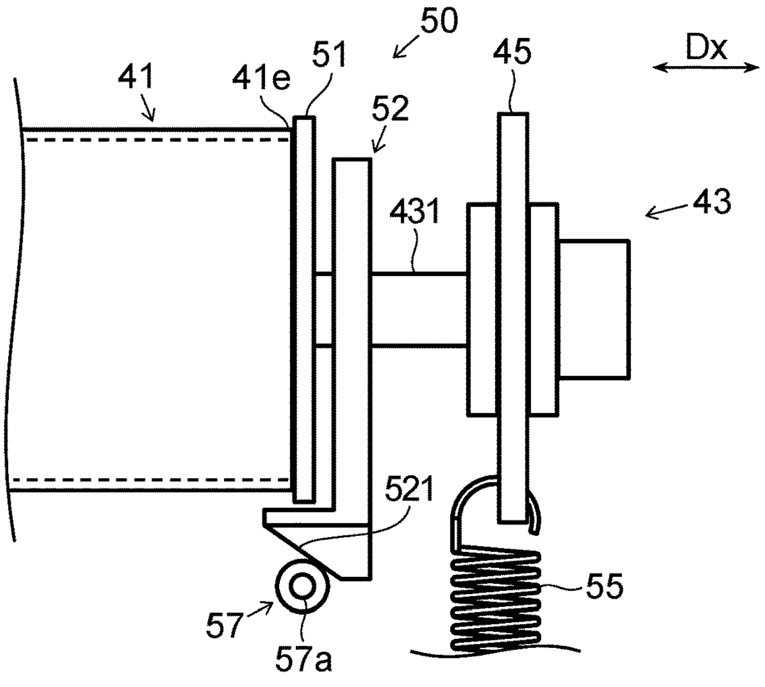
FIG. 7 is a partial side view of and around a tension roller of a belt conveyance device according to a third embodiment of the present disclosure.

Next, a description will be given of a structure of and around a tension roller 43 of a belt conveyance device 40 according to a third embodiment, with reference to FIG. 7. FIG. 7 is a partial side view of and around a tension roller 43 of a belt conveyance device 40 according to a third embodiment of the present disclosure. The structure of the third embodiment is basically the same as that of the first embodiment discussed previously; accordingly, such components as are found also in the first embodiment are identified by common reference signs or part names, and overlapping description thereof may be omitted.

The belt conveyance device 40 of the third embodiment includes a correction mechanism 50. The correction mechanism 50 is disposed at the opposite end parts of the tension roller 43 in its axial direction Dx and below the tension roller 43. The correction mechanism 50 includes a pair of belt guides 51, a pair of inclined bearings 52, a coupling member 53 (unillustrated in FIG. 7), a pair of main body guides 57, and a pair of biasing members 55.

The pair of main body guides 57 are constituted of a pair of rotary bodies that each rotate about an axis of a shaft portion 57*a* extending in a direction (a depth direction of the plane of FIG. 7) perpendicular to the axial direction Dx of the tension roller 43. The pair of main body guides 57 have their outer circumferential surfaces in contact with the pair of inclined portions 521, and rotate while in contact with the pair of inclined portions 521.

According to this structure, a contact state between the pair of inclined bearings 52 and the pair of main body guides 57 can be a rolling friction contact. Rolling friction is much smaller than sliding friction in friction force, and thus it is possible to reduce friction load. With reduced friction load, it is possible to suppress wear of the pair of inclined bearings 52 and the pair of main body guides 57, and thus to maintain preferable performance of stopping meandering of the intermediate transfer belt 41.

The above-described embodiments are by no means meant to limit the scope of the present disclosure, and various modifications can be made and implemented within the scope not departing from the gist of the present disclosure.

For example, in the embodiments described above, the belt conveyance device 40 is structured to include the intermediate transfer belt 41 onto which toner images formed at the four image forming portions 20 are sequentially transferred to be superposed one on another, but it is not limited to such a device. The present disclosure is also applicable to a belt conveyance device provided with a conveyance belt that conveys a recording medium on which an image is recorded by an image forming portion, for example.

Further, in the above embodiments, the image forming apparatus 1 is described as what is called a tandem-type image forming apparatus for color printing, but the image forming apparatus 1 is not limited to such a type. The image forming apparatus 1 may also be an image forming apparatus for color printing of any type other than the tandem type, as long as it is provided with an intermediate transfer belt.

What is claimed is:

1. A belt conveyance device, comprising:
a belt that is endless;
a plurality of rollers that rotatably stretch the belt therearound; and
a correction mechanism that corrects meandering of the belt with respect to the rollers,
wherein
the correction mechanism includes
a pair of inclined bearings that include a pair of inclined portions inclined to be symmetric with respect to an axial direction of the rollers, that rotatably support a shaft portion of one roller among the plurality of rollers, and that are movable in an axial direction of the one roller, and
a pair of main body guides that contact the pair of inclined portions, and that, when the belt meanders, cause one end part side of the one roller in the axial direction thereof to move in a direction perpendicular to the axial direction thereof, along with the pair of inclined bearings that move in the axial direction of the one roller as a result of the meandering of the belt; and
the pair of inclined portions and the pair of main body guides are disposed inward of opposite end parts of the one roller in the axial direction thereof, as seen from a direction perpendicular to the axial direction of the one roller.

2. The belt conveyance device according to claim 1, wherein
the pair of inclined portions and the pair of main body guides are disposed below the one roller.

3. The belt conveyance device according to claim 1, wherein
the pair of main body guides are constituted of a pair of cylindrical members that extend in a direction perpendicular to the axial direction of the one roller, and of which outer circumferential surfaces contact the pair of inclined portions.

4. The belt conveyance device according to claim 1, wherein
the pair of main body guides are constituted of a pair of rotary bodies that rotate, while in contact with the pair of inclined portions, about an axis extending in a direction perpendicular to the axial direction of the one roller.

5. The belt conveyance device according to claim 1, wherein
the correction mechanism includes a pair of biasing members that bias the pair of inclined bearings toward the pair of main body guides so as to keep the pair of inclined bearings in contact with the pair of main body guides.

6. An image forming apparatus, comprising:
a plurality of image forming portions; and
the belt conveyance device according to claim 1 that is disposed adjacent to the image forming portions, and that conveys a recording medium on which an image is recorded by the image forming portions.

7. An image forming apparatus, comprising:
a plurality of image forming portions; and
the belt conveyance device according to claim 1 that is disposed adjacent to the image forming portions, and of which the belt is an intermediate transfer belt onto which toner images formed at the image forming portions are sequentially transferred to be superposed one on another.

* * * * *